April 30, 1968
G. L. MAYO
3,380,494
WOOD COMPONENT MEMBER CUTTING APPARATUS
Filed April 15, 1966
4 Sheets-Sheet 1
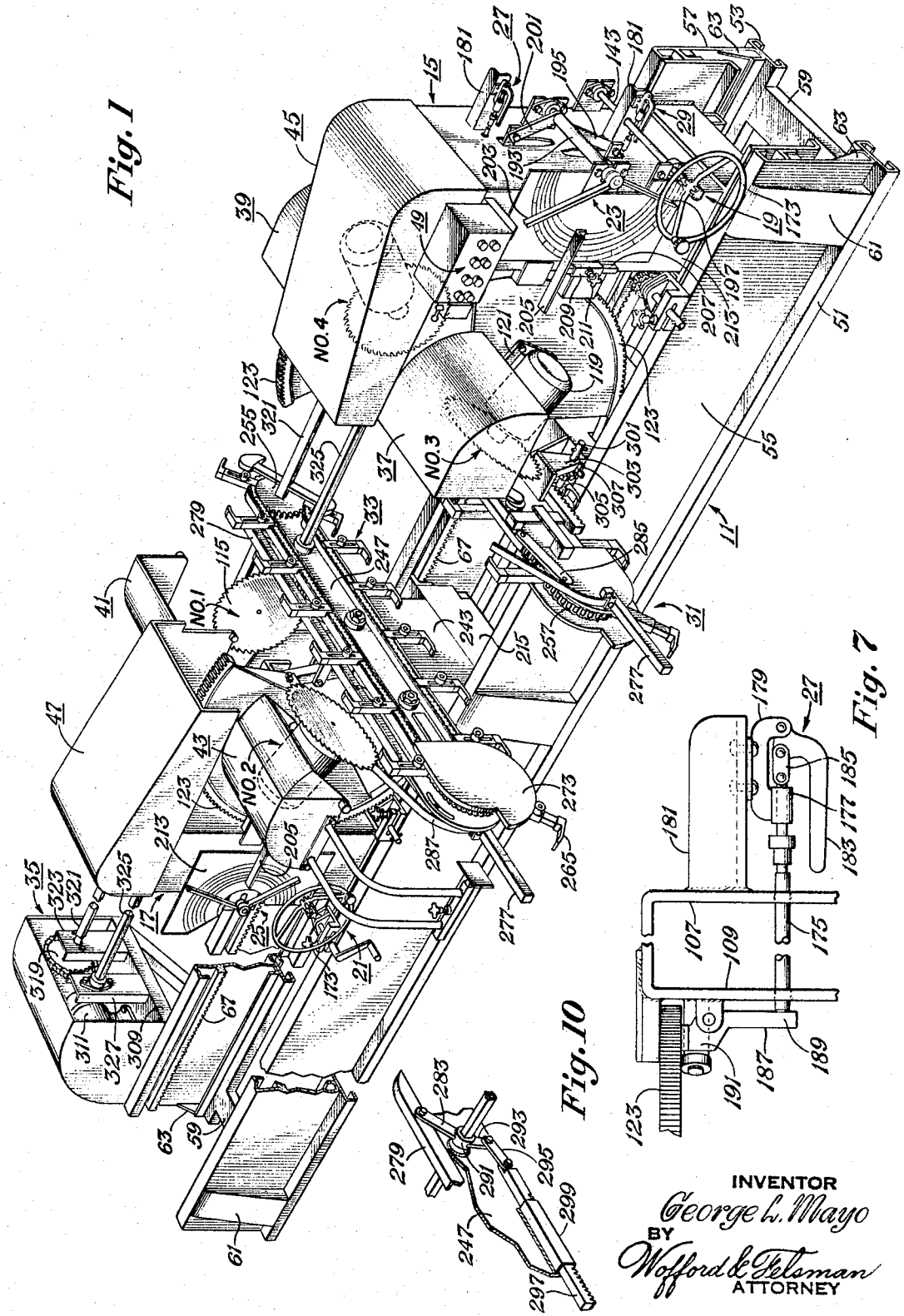
INVENTOR
George L. Mayo
BY
Wofford & Felsman
ATTORNEY April 30, 1968  G. L. MAYO  3,380,494
WOOD COMPONENT MEMBER CUTTING APPARATUS
Filed April 15, 1966  4 Sheets-Sheet 2
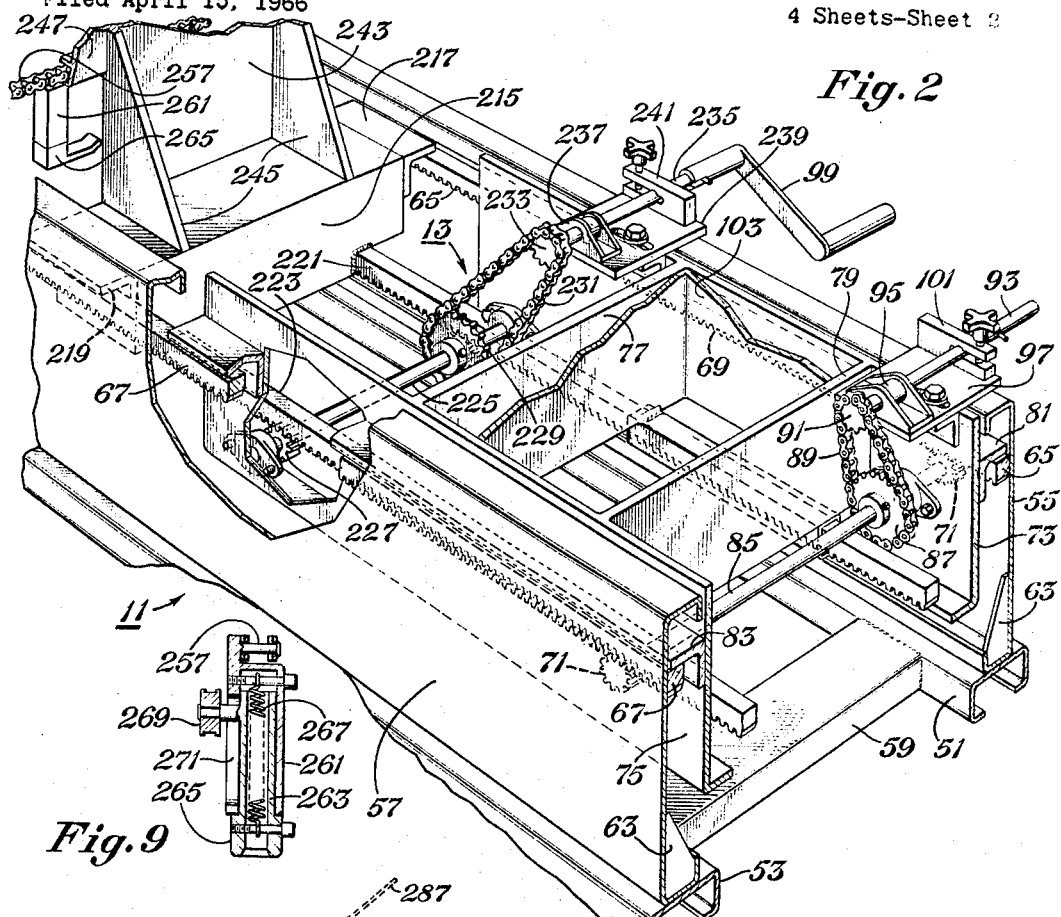
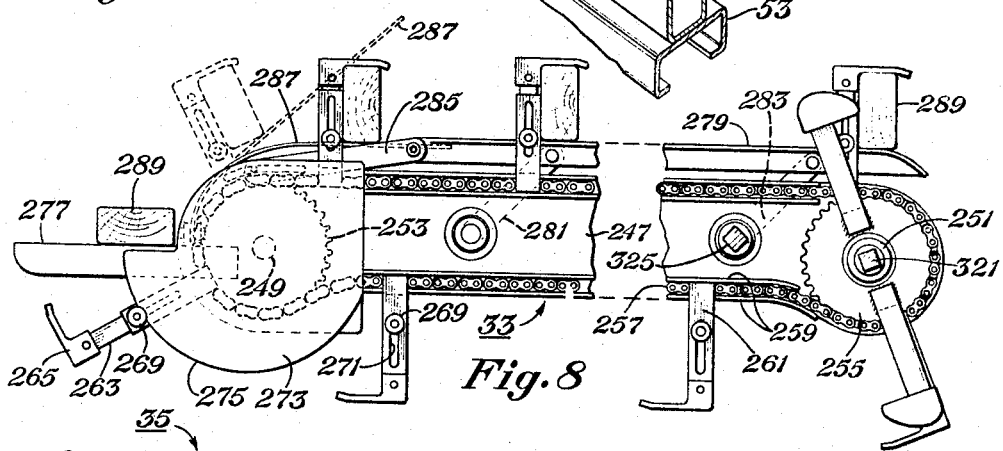
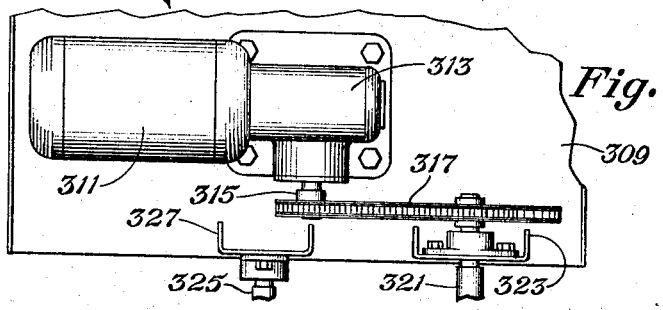
INVENTOR
George L. Mayo
BY
Wofford & Felsman
ATTORNEY

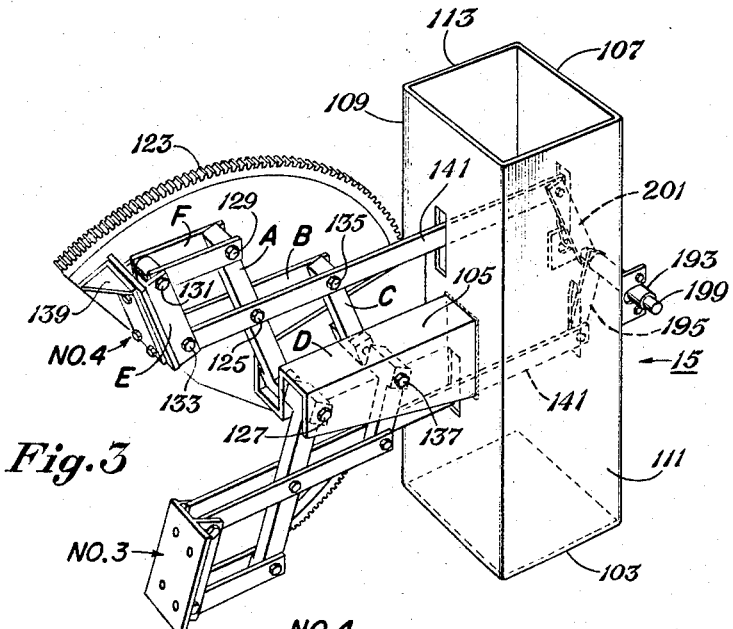

April 30, 1968  G. L. MAYO  3,380,494
WOOD COMPONENT MEMBER CUTTING APPARATUS
Filed April 15, 1966  4 Sheets-Sheet 4

INVENTOR
George L. Mayo
BY
Wofford & Felsman
ATTORNEY 3,380,494
WOOD COMPONENT MEMBER
CUTTING APPARATUS
George L. Mayo, 4513 S. Edgewood Terrace,
Fort Worth, Tex. 76119
Filed Apr. 15, 1966, Ser. No. 542,889
24 Claims. (Cl. 143—38)

This invention relates to wood component member cutting apparatus, and more particularly to apparatus for mass producing precut wood members to be used in building construction.

Machines of this general type are shown and described in my U.S. Patents Nos. Re. 25,715 and 3,229,732.

The invention in the instant case resides in improvements that I have made in machines of the type disclosed by my prior patents above-mentioned.

Thus, generally stated, the object of this invention is to provide a machine of the general type disclosed by my prior patents above-mentioned, but incorporating various improvements.

More specifically, an important object of this invention is to provide improved saw pivot structures and arrangements, together with attendant advantages in overall machine structure.

Another object of this invention is to provide a machine of the general type disclosed by prior patents, but incorporating improved conveyor workpiece handling mechanism.

Another object of this invention is to provide a machine of the general type disclosed by my prior patents, but wherein the control arrangement for setting the positions of the saw is significantly improved.

Another object of this invention is to provide a machine of the general type disclosed by my prior patents, but wherein the saw positions may be readily and conveniently set from a sample pattern.

Another object of this invention is to provide a machine of the general type disclosed by my prior patents, but wherein the saw arrangement for cutting short workpieces is significantly improved.

These and other objects are effected by this invention as will be apparent from the following description taken in accordance with the accompanying drawings, forming a part of this application, in which:

FIG. 1 is a schematic perspective view of a wood component member cutting machine in accordance with a preferred embodiment of this invention, but with some portions simplified and with other portions omitted for clarification purposes;

FIG. 2 is a fragmentary schematic perspective view showing details of the main frame and carriage assembly of the machine of FIG. 1, as seen from the right rear, with parts including saw assemblies removed for clarification;

FIG. 3 is a schematic perspective view of portions of two saw assemblies, their support structure, and saw position indicia mechanism;

FIG. 4 is a schematic plan view of portions of two assemblies, their support structure, sector gear drive mechanism, sector gear brake mechanism, and saw position indicia mechanism;

FIG. 5 is a schematic perspective view of the sector gears of two saw assemblies and portions of their sector gear drive mechanism;

FIG. 6 is a schematic plan view showing details of the crank wheel, clutch, primary drive shafts, and primary sprockets of a sector gear drive mechanism;

FIG. 7 is a schematic plan view illustrating a sector gear brake mechanism;

FIG. 8 is a fragmentary schematic side elevational view of the rear conveyor assembly as seen from the front side;

FIG. 9 is a schematic vertical section view showing details of a conveyor dog assembly;

FIG. 10 is a schematic fragmentary perspective view showing details of the conveyor elevation positioner mechanism;

FIG. 11 is a schematic plan view showing a portion of the conveyor drive mechanism;

Figure 12:
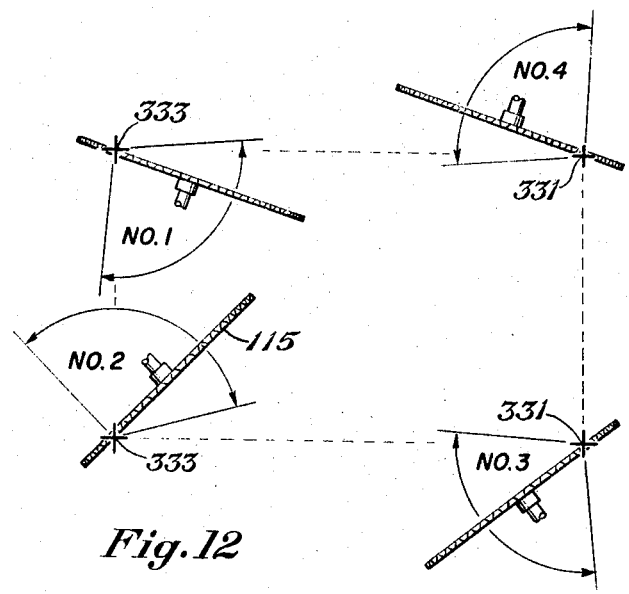
FIG. 12 is a diagram illustrating the pivoting action of the saws.

Referring now to the drawings, there is shown a wood component member cutting machine including a main frame structure 11, a No. 1 saw assembly, a No. 2 saw assembly, a No. 3 saw assembly, and a No. 4 saw assembly. For reference convenience herein, the left end of the machine as viewed in FIG. 1 will be considered as the rear, the right end as the front, the near side as the left side, and the far side as the right side.

The No. 1 and No. 2 saw assemblies are located at the front end portion of the main frame 11 and are fixed so as to have no longitudinal movement relative to the main frame. The No. 1 saw is located on the left side portion while the No. 2 saw is located upon the right side portion. The No. 3 and No. 4 saw assemblies are supported on a carriage assembly 13 (see FIG. 2) which is arranged for longitudinal movement on the main frame 11. The No. 4 saw is located on the left side portion, while the No. 3 saw is located on the right side portion.

The machine further includes a front saw assembly support structure 15, a rear saw assembly support structure 17, front sector gear positioner mechanism 19, rear sector gear positioner mechanism 21, front saw position indicia mechanism 23, rear saw position indicia mechanism 25, and a sector gear brake mechanism 27, 29 for each saw assembly.

The machine further includes a front conveyor assembly 31, a rear conveyor assembly 33, a conveyor drive mechanism 35, a hood assembly 37, 39, 41, 43 for each saw assembly, a hood assembly 45, 47 for each saw assembly support structure, and a machine control assembly 49.

The machine main frame structure 11 includes a pair of base members 51, 53, a plurality of transverse brace members 59, a pair of upstanding side members 55, 57, a plurality of upstanding reinforcing ribs 61, and a plurality of reinforcing gusset plates 63. The base members 51, 53 are parallel spaced juxtaposed channel members running the length of the machine. Each base member channel 51, 53 has a web portion, side portions, and inwardly turned flange portions. Each base member is disposed with the web portion facing upwardly. Each side channel member has a web portion, two side portions, and inwardly extending flange portions. Each side member is disposed on a respective base member such that one of its sides rests on the base member web portion, the side member web is upstanding, and the open faces of the side member channels are oppositely disposed and parallel. The side members 55, 57 are fixed to the base members 51, 53 by any suitable means, such as welding. The transverse brace members 59 extend between the base members 51, 53 and are fixed thereto by any suitable means, such as by welding. Gusset plates 63 are disposed at intervals along the side members lower inner surfaces and normal thereto, and serve to reinforce the side members. The upstanding reinforcing ribs 61 are disposed at intervals along the main frame exterior and are fixed as by welding to the side member and base member web portions. The precise nature of the main frame structure 11 is not a critical part of this invention, the principal requirement being only that the main frame structure be sufficiently strong and rigid to serve its purpose.

Fixed, by welding, to the upper portion of the inner face of the web portion of each side member 55, 57 and extending the length of the respective side member and parallel to the sides thereof is a respective rack rail 65, 67, having gear teeth 69 on its bottom face. The rack rails 65, 67 serve a two-fold purpose. First, they serve as rails for the carriage assembly 13 and the conveyor assemblies 31, 33 to run on, and second, they provide gears for the carriage drive pinions 71 to act upon to traverse the carriage assembly 13 longitudinally along the side members 55, 57.

The carriage assembly 13 (see FIG. 2) has a frame structure made up of a pair of side members 73, 75 held in juxtaposed spaced parallel relation by a pair of transverse wall members 77, 79. Fixed to the outer face of each side member 73, 75 is a bearing member 81, 83 in the form of an angle bar. The bearing members extend longitudinally of the side members 73, 75 and parallel to the longitudinal margins thereof. Each bearing member 81, 83 has a surface that rides on a respective rack rail 65, 67, thus supporting the carriage assembly 13 for longitudinal movement thereon. Journalled in the side members 73, 75 and extending transversely thereof is a carriage secondary drive shaft 85 mounting at its outer end portions the carriage drive pinions 71, which engage the gear teeth 69 of the respective rack rails 65, 67. Fixed to the drive shaft 85 intermediate the side members 73, 75 is a secondary sprocket 87 carrying a drive chain 89 which also engages a primary sprocket 91. The primary sprocket 91 is mounted on the inner end portion of a primary drive shaft 93 which is journalled on a bracket 95. The bracket is fixed to a plate 97 which in turn is mounted on the carriage side wall 55 adjacent its upper margin. The primary drive shaft 93 is disposed parallel to the secondary drive shaft 85 and has an outer end portion which extends beyond the main frame side wall and is adapted for receiving a crank 99. The primary shaft 93 may be held against rotation by means of conventional clamp type brake device 101.

The front and rear saw assembly support structures 15, 17 are identical, and consequently, only the front one (which is shown in FIGS. 3 and 4) will be described. Each saw assembly support structure 15, 17 is made up of a pedestal 103 and a pivot support bracket 105. The pedestal 103 may take the form of a large upstanding box beam, having front, rear, left and right side faces 107, 109, 111, 113. The pivot support bracket 105 may have the form of a channel beam the transverse section of which is an upwardly disposed U-shaped trough sharing a common wall with a juxtaposed downwardly disposed U-shaped trough. The pivot support bracket 105 has one of its ends abutting the pedestal rear face 109 at the central region thereof and is welded thereto. Thus, the pivot support bracket 105 projects rearwardly from the pedestal 103.

Each saw assembly support structure carries two saw assemblies. The front saw assembly support structure 15 carries the No. 3 and No. 4 saw assemblies, while the rear saw assembly support structure 17 carries the No. 1 and No. 2 saw assemblies.

The No. 1 and No. 2 saw assemblies are essentially identical respectively to the No. 3 and No. 4 saw assemblies, and consequently only the No. 3 and No. 4 saw assemblies (see FIGS. 3 and 4) will be described. Each of the No. 3 and No. 4 saw assemblies includes a saw blade 115 mounted to the output shaft 117 of a saw drive motor 119, which is fixed to a motor mount bracket 121 which in turn is fixed to a sector gear 123. Each of the No. 3 and No. 4 saw assemblies further includes a pivot linkage structure, sometimes herein referred to as a parallelogram linkage mechanism. In general principle of operation, the parallelogram linkage mechanisms per se that are utilized by this invention are the same as those disclosed in my U.S. Patent No. 3,229,732. Each parallelogram linkage mechanism includes first and second main links A, B pivotally connected at their longitudinal centers to form an X and establishing a first pivot axis 125, a side link C, a base link D, a support link E, and an end link F. The base link D is formed by a portion of the pivot support bracket 105 saw assembly support structure 15 and is fixed. The first main link A is pivotally connected at one end to one end of the base link D to establish a second pivot axis 127, and is pivotally connected at its other end to one end of the end link F to establish a third pivot axis 129. The end link F is pivotally connected at its other end to one end of the support link E to establish a fourth pivot axis 131. The other end of the support link E is pivotally connected to one end of the second main link B to establish a fifth pivot axis 133. The other end of the second main link B is pivotally connected to one end of the side link C to establish a sixth pivot axis 135. The other end of the side link C is connected to the other end of the base link D to establish a seventh pivot axis 137.

Figure 14:
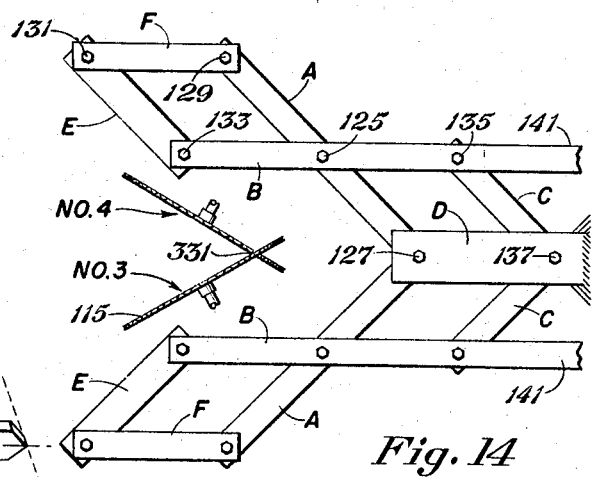
FIG. 14 is a schematic diagram illustrating the pivoting relationship of adjacent saw assemblies.

The sector gear 123 for each saw assembly has fixed to it a mounting bracket 139 which in turn is fixed to the support link E of the parallelogram linkage mechanism. The sector gear 123 in each case is disposed adjacent the outer side of the parallelogram linkage mechanism so as to rotate in a plane parallel to the linkage mechanism central plane and so as to rotate about its central axis which coincides with an axis normal to the point of intersection of the longitudinal axes of the support link E and the base link D (see FIG. 14). The second main link B of each parallelogram linkage mechanism has an indicia control portion 141 extending longitudinally outward beyond the sixth pivot axis for a purpose to be hereinafter explained.

As shown in FIG. 3, the saw assembly support structure 15 carries the parallelogram linkage mechanism for the No. 4 saw in an upstanding disposition, or in other words, with the first main link A and the side link C extending upwardly from the base link D. As further shown in FIG. 3, the saw assembly support structure 15 carries the parallelogram linkage mechanism for the No. 3 saw in a depending position, or in other words, with the first main link A and the side link C extending downwardly from the base link D. Also, the base link pivot axes 127, 137 for the two linkage mechanisms have common pivot shafts, such that the respective first main links A and side links C are juxtaposed, and the common pivot shafts are mounted to a common pivot support means 105. Further as shown in FIG. 3 the parallelogram linkage mechanism for the No. 4 saw assembly is on the far or right side of the pivot support means and the associated saw blade will pivot above a common pivot axis (see FIGS. 12, 13, 14), while the No. 3 saw assembly is on the rear or left side of the pivot support means and the associated saw blade will pivot below the common pivot axis.

The rear saw assembly support structure 17 is mounted on the carriage assembly 13, with the pedestal 103 disposed within the box formed by the transverse wall members 77, 79 and the carriage side members 73, 75 and fixed thereto, as by welding.

The front saw assembly support structure 15 is fixed relative to the main frame structure 11 and is identical to the carriage assembly 13 less the carriage drive components, with the bearing members 81, 83 being fixed, as by welding, to the rack rails 65, 67.

As hereinbefore mentioned, there are provided front and rear sector gear positioner mechanisms 19, 21. Since these are essentially identical, only the front one (see FIGS. 4, 5, 6) will be described. Each sector gear positioner mechanism includes a far sector gear primary shaft 143 which is journally mounted on the front face 107 of the saw assembly support structure pedestal 103 and has a near end portion extending outwardly of the near or left side of the pedestal and a far end portion extending outwardly of the far or right side of the pedestal. The far primary shaft 143 is tubular, having a central bore, and mounting at the far end a primary sprocket 145 which carries a drive chain 147 which engages a secondary sprocket 149 which is mounted on the far end of a secondary shaft 151 which is journally mounted to the rear face of the pedestal 103. The near end of the secondary shaft 151 carries a pinion 153 which engages the sector gear 123 of the No. 4 saw assembly. Fixed on the near end portion of the far primary shaft is a clutch spline collar 155 for a purpose to be presently explained. Each sector gear positioner mechanism includes a near sector gear primary shaft 157 which is journalled within the far sector gear primary shaft 143 and extends outwardly from both ends of same. Mounted on the far end of the near sector gear primary shaft 157 is a primary sprocket 159 which carries a drive chain 161 which engages a secondary sprocket 163 which is mounted on the far end of a secondary shaft 165 which is journally mounted to the rear face of the pedestal 103. The near end of the secondary shaft 165 carries a pinion 167 which engages the sector gear 123 of the No. 3 saw assembly. Fixed on the near end of the near sector gear primary shaft is a clutch spline collar 169. Slidably mounted on the near sector gear primary shaft 157 intermediate the clutch spline collars 155, 169 is the splined hub 171 of a crank wheel 173. The crank wheel 173 can be moved toward the pedestal 103 to engage the clutch spline collar 155 of the far sector gear primary shaft 143 for controlling the position of that sector gear, or it can be moved away from the pedestal 103 to engage the clutch spline collar 169 of the near sector gear primary 157 shaft for controlling the position of that sector gear. It should be noticed that for the rear sector gear positioning mechanism 21 the primary drive shafts 143, 157 will be brought in from the sides of the primary sprockets 145, 159 opposite to that shown in FIG. 5, but will be set up so that the crank wheel position sense is the same as for the front sector gear positioning mechanism 19, that is, the crank wheel 183 moves toward the pedestal 103 to engage the spline collar of the primary shaft 143 that controls the sector gear of the far or No. 1 saw assembly.

For each sector gear 123, there is provided a sector gear brake mechanism 22, 29 designed to hold the sector gear fixed at any selected rotational position. Since the sector gear brake mechanisms are all essentially identical, only the one for the sector gear of the No. 4 saw assembly will be described (see FIG 7). Each brake mechanism includes a push rod 175 which extends through the pedestal front and rear faces 107, 109 and outwardly beyond same. The front end portion of the push rod is slidable within a sleeve 177 of a toggle support bracket 179 which is fixedly secured to a mounting arm 181 that in turn is fixedly mounted to the pedestal front face 107 and extends outwardly therefrom. A toggle lever control handle 183 is pivotally connected at its inner end portion to the toggle support bracket 179 and to a one end of a toggle link 185, the other end of which is pivotally connected to the front end of the push rod 175. Thus, the push rod is reciprocated by movement of the control handle 183, A bell crank 187 is pivotally mounted to the rear face of the pedestal 109 for swinging movement about a vertical axis and has one arm 189 extending generally parallel to the pedestal rear face 109 so as to be contacted by the rear end of the push rod 175, and the other arm 191 extending so as to have a friction surface closely adjacent and generally parallel to the rim of the sector gear 123. When the control handle 183 is closed, the push rod 175 bears against the one bell crank arm 189, causing the friction surface to tightly engage the sector gear rim to hold same against movement away from any selected rotational position. When the toggle control handle 183 is opened, the push rod 175 moves frontward away from the bell crank arm 189, thus releasing the brake. The control handle 183 of each respective brake mechanism is disposed within convenient reach of the machine operator when he is positioned for manipulating a respective crank wheel 173.

As hereinbefore mentioned, there are provided indicia mechanisms 23, 25. Since these are essentially identical, only the front one (see FIGS. 1, 3) will be described. Each saw position indicia mechanism includes an outer shaft 193 which is rotated responsive to the movement of the near sector gear 123. This outer shaft 193 is journally mounted to the front face of the pedestal 103 for rotation about a horizontal axis which is parallel to and in the plane containing the common pivot axes of the saws. The outer shaft 193 has a near end portion extending a short distance outwardly beyond the pedestal 103 and a far end portion which terminates at about the center of the pedestal front face 107. Fixed to the outer shaft far end and extending radially therefrom and parallel to the end link C of the respective parallelogram pivot mechanism is an indicia link arm 195 which is pivotally connected at its outer end to the front end of the respective indicia control portion 141 of the respective second main link B. Fixed to the near end portion of the outer shaft 193 and extending radially outwardly therefrom is a near saw assembly indicia arm 197 having a surface and/or edge that is parallel to the face of the respective associated saw blade 115 (in this case, of the No. 3 saw assembly). Each saw position indicia mechanism also includes an inner shaft 199 which is rotated responsive to movement of the far sector gear 123. This inner shaft 199 is journalled within the outer shaft 193 for rotation about the same axis as the outer shaft and having a near end and a far end extending outwardly beyond the respective end of the outer shaft. Fixed to the inner shaft far end and extending radially therefrom and parallel to the end link C of the respective parallelogram pivot mechanism is an indicia link arm 201 which is pivotally connected at its outer end to the front end of the respective indicia control portion 141 of the respective second main link B. Fixed to the near end portion of the inner shaft 199 and extending radially outwardly therefrom is a far saw assembly indicia arm 203 having an edge and/or surface that is parallel to the face of the respective associated saw blade 115 (in this case, of the No. 4 saw assembly). Each saw position indicia mechanism further includes a horizontally disposed pattern support shelf 205 which is fixed to the upper end of a vertical column 207 which is reciprocable within a sleeve 209 and maintained in any selected longitudinal position by means of a set screw 211.

The sleeve 209 is mounted to the left side face of the pedestal 103 so that the shelf 205 can support a workpiece pattern (not shown) with its longitudinal centerline in the plane of the saw common pivot axes and with its end portions contactable by the indicia arms 197, 203, as will be hereinafter more fully explained. Also mounted on the left side face of the pedestal 103 is an indicia scale plate 213 bearing pertinent scale information for saw settings when the pattern sample is not used.

As hereinbefore mentioned, there are provided front and rear conveyor assemblies 31, 33. Since these are essentially identical, only the rear one (see FIGS. 1, 2, 8, 9, 10) will be described. Each conveyor assembly includes a carriage base structure, a main frame structure, and a pedestal support structure. The carriage base structure may be a box beam 215 extending transversely of the machine side members 55, 57 and spaced therefrom, with angle bearing members 217, 219 fixed to the upper margins of the box beam ends so as to ride on the respective rack rails 65, 67. A pair of parallel spaced rack rails 221, 223 are fixed to the bottom portion of the box beam 215 and extend rearwardly therefrom. A secondary drive shaft 225 extends transverely between the carriage assembly side members 73, 75 at their lower forward end portions and is journally mounted thereon. The secondary drive shaft 225 mounts a pair of pinions 227 which engage respective rack rails 221, 223. The secondary shaft 225 also mounts a secondary sprocket 229 carrying a drive chain 231 which also engages a primary sprocket 233. The primary sprocket 233 is mounted on the inner portion of a primary drive shaft 235 which is journalled on a bracket 237. The bracket 237 is fixed to a plate 239 which in turn is mounted on the carriage near side wall 73 adjacent its upper margin. The primary drive shaft 235 is disposed parallel to the secondary drive shaft 225 and has an outer end portion which extends beyond the main frame side wall 55 and is adapted to receive a crank 99. The primary shaft 235 may be held against rotation by means of a conventional clamp type brake device 241. The pedestal support structure is mounted on the upper face of the box beam 215 and may include an upstanding plate member 243 extending parallel to the box beam front margin and integral triangular side plate members 245 extending rearwardly from the upstanding plate member 243.

The carriage main frame structure may include an upstanding web member 247 which is fixed as by welding to the front face of the pedestal support structure upstanding plate member 243, and which extends transversely of and above machine main frame side members 55, 57 and also outwardly beyond same. The web member 247 has a stub shaft 249, 251 fixed at each end portion thereof, with each stub shaft extending forwardly therefrom and journally mounting a conveyor sprocket 253, 255. A conveyor chain 257 is carried by the sprockets 253, 255 and is guided along the web forward side by means of guide channel 259 which are integral with the web 247 and serve also as reinforcing ribs. The conveyor chain 257 carries a plurality of essentially identical conveyor dogs which extend outwardly from the chain at spaced intervals. Each conveyor dog (see FIG. 9) includes a slotted sleeve 261 which is fixed at one end to the conveyor chain 257, a shank 263 which is reciprocable within the sleeve, and a foot or clamp 265 that is fixed to the outer end of the shank. The shank has a central bore within which there is disposed a tension spring 267 which is anchored at one end to the sleeve 261 and at the other end to the shank 263, thus urging the shank and foot 265 inwardly toward the chain 257. A cam follower roller 269 is mounted on the forward side of each shank, with its shaft extending through a longitudinal slot 271 in the sleeve. A cam plate 273 is mounted in fixed spaced relation to the web 247 and adjacent the forward surface of the near sprocket 253 at the loading end of the conveyor. The cam plate working surface 275 is disposed to be engaged by each conveyor dog roller 269 as the conveyor dog approaches the conveyor loading end, and acts to extend the dog shank 263 until the dog reaches the workpiece pickup station, at which time the roller 269 moves off the cam surface 275. A horizontally disposed workpiece loading shelf rail 277 is fixed to the web far side adjacent the loading end and extends outwardly beyond the cam plate extremity. A conveyor runner 279 in the form of an angle member has a horizontally disposed workpiece receiving surface which tapers downwardly at either end portion. The conveyor runner 279 extends above the web 247 and adjacent to but spaced from the far side of the dogs. The conveyor runner 279 is supported by a plurality of parallel link members 281, 283, each of which is pivotally connected at one end to the runner 279 and at the other end to web 247. A further link member 285 is pivotally connected at one end to the runner 279 adjacent its near end portion and slidably connected at the other end to the web 247, so as to provide an inclined workpiece runner surface extending from the curved workpiece contacting portions of the web near end and cam plate upwardly to the level of the conveyor runner surface. A spring strip member 287 is fixed at one end to the web side face adjacent the web near end and extends upwardly and inwardly therefrom so as to contact the workpieces 289 and tend to hold them in place in contact with the dog foot 265 until the workpiece reaches the level of the conveyor runner 279.

One of the conveyor runner supporting parallel link members 283 (for the front conveyor assembly only) is an arm of a bell crank having another arm 293 (see FIG. 10) which is pivotally connected to one end of an intermediate link 295 which is pivotally connected at its other end to a rack 297. The rack 297 extends through a guide sleeve 299 which is fixed to the rear side of the web 247. A crank shaft 301 is journalled in a bracket 303 which is also fixed to the web rear side adjacent to and above the machine main frame structure near side member 55. The crank shaft 301 mounts a pinion 305 at one end which engages the rack, and is adapted at the other end to receive a crank. A conventional clamp type brake device 307 is associated with the crank shaft. The rack 297 and its associated parts are provided for the front conveyor assembly only.

A platform 309 is mounted to the machine main frame structure far side member 57 at its rear end portion and extends outwardly therefrom. Mounted on the platform 309 is a portion of the conveyor drive mechanism (see FIG. 11) including an electric motor 311 driving a gear box 313 having an output shaft 315 mounting a first sprocket carrying a chain 317 which drives a second sprocket 319. The second sprocket is mounted to one end of a long rectangular bar shaft 321 which may be termed the conveyor drive shaft. This conveyor drive shaft 321 is mounted journally at the drive end on a support bracket 323 which is fixed to the platform 309, and is journally mounted at the other end to the pedestal 103 of the front saw assembly support structure 15. The stub shafts 251 that mount the far sprockets 255 of both front and rear conveyor assemblies 31, 33 each have a rectangular bore that is mateable with the conveyor drive shaft 321. The conveyor drive shaft extends through openings in the webs 247 and through the rectangular bores of the far sprocket stub shafts 251 of both the front and rear conveyor assemblies 31, 33.

The bell crank 283, 293 of the front conveyor assembly 31, as well as the corresponding aligned pivot link of the rear conveyor assembly 33 are provided with rectangular hubs 291 which are mateable with a second long rectangular bar shaft which may be termed the conveyor runner elevator shaft 325. This elevator shaft is journally mounted at one end to a bracket 327 which is supported on the platform 309, and is journally mounted at the other end to the rear face of the pedestal 103 of the front saw assembly support structure 15. The elevator shaft 325 extends through the rectangular hubs 291 of both the front and rear conveyor assemblies 31, 33.

Figure 13:
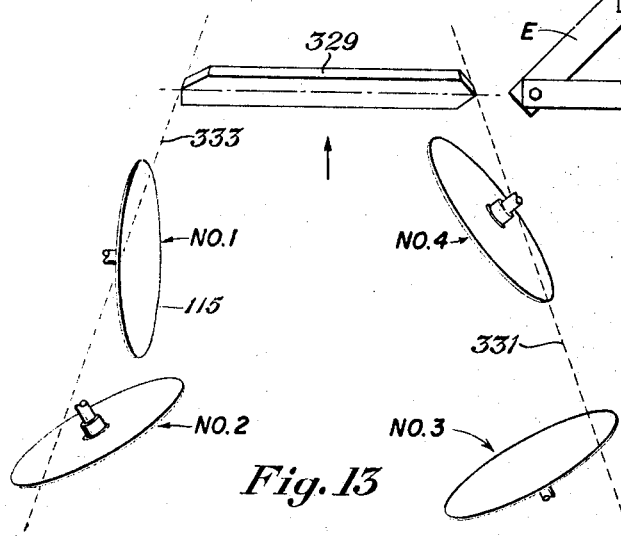
FIG. 13 is a schematic perspective diagram illustrating the cutting action of the saws.

The wood component member cutting machine of the present invention finds a primary application in the cutting of component members for roof trusses. In this application, elongate wood workpiece members are conveyed between the machine saw pairs and the requisite cutting operations are performed. A typical such workpiece 329 is shown in FIG. 13. The workpiece 329 has been conveyed past the saw pairs in the direction indicated and the requisite cuts have been made, as shown. The operation of the machine to produce the typical roof truss component 329 will now be explained.

The carriage assembly 13 is traversed by cranking the drive shaft 93 until the rear saw assemblies have been spaced the requisite distance from the front saw assemblies. As hereinbefore mentioned, the rear saw assemblies (No. 1 and No. 2) each pivot on a chord of the face of their respective saw blade, and these chords coincide with the rear common pivot axis 333. Similarly, the front saw assemblies (Nos. 3 and 4) pivot on a chord of the face of their respective saw blade, and this chord coincides with the front common pivot axis 331. Also, the common pivot axes 331, 333 are parallel and lie in a common plane. The front and rear saw assemblies are actually spaced such that the distance between the common pivot axes 331, 333 is equal to the desired length of the component member 329.

Next, the saw pivot support structures (shown in the preferred embodiment as parallelogram linkage mechanisms) are moved so that the saw blades 115 are disposed in the requisite relative angular positions. In accordance with some aspects of the present invention, this movement may be accomplished by any suitable means. However, in accordance with a feature of the present invention, it is accomplished by positioner mechanisms including inner and outer concentric shafts 157, 143 journalled for rotation about an axis that is parallel to the common pivot axes 331, 333, with a crank 173 rotatably mounted on the inner shaft 157, with means 169, 171, 175 for selectively engaging the crank with the inner and outer shaft and with driving means connecting each respective inner and outer shaft to pivot a respective saw pivot support structure. In the preferred embodiment, front and rear sector gear positioner mechanisms 19, 21 are utilized for this purpose. It is understood that when a respective saw assembly has been pivoted to the requisite position, then the associated sector gear brake mechanism 27, 29 is actuated to fix the saw assembly in the selected position.

In order to determine when a respective saw blade 115 is properly positioned, a suitable saw position indicia mechanism is provided. In accordance with a feature of the present invention, there is provided a front and a rear saw position indicia mechanism, each including inner and outer concentric shafts 199, 193 journalled for rotation about a respective indicia axis that is parallel to the common pivot axes 331, 333, with an indicia arm 203, 197 fixed to each concentric shaft, with the indicia arms of each indicia mechanism disposed in adjacent juxtaposed relation, with each indicia arm having an edge disposed parallel to the face of a respective saw blade, and with means synchronously linking each said concentric shaft to the respective saw pivot support structure associated with the respective saw blade. The indicia arms are disposed to sweep the face of a respective indicia scale plate 213. The requisite position for a particular saw blade is reached when its associated indicia arm is lined up with the appropriate marking on the associated indicia scale plate. In the preferred embodiment, there are provided front and rear saw position indicia mechanisms 23, 25. Also, in the preferred embodiment of the present invention, the saw pivot support structures are parallelogram linkage mechanisms, each having a base link D, a support link E, and first and second main links A, B, with respective indicia axes lying in the plane of the front and rear common pivot axes 331, 333, and with the synchronously linking means including an indicia link arm 195, 201 fixed to each concentric shaft and disposed parallel to a respective first main link A, with an indicia control portion extension 141 for each second main link B pivotally connected to the indicia link arm and parallel to the base link.

In accordance with another feature of the present invention, if desired, a workpiece pattern may be utilized to set the saw assemblies to the requisite relative angular position. For this purpose, there may be provided a workpiece pattern support shelf 205 and associated parts, as previously herein described. The workpiece pattern is disposed on the shelf means so that its end cuts are presented in abutting relation to the respective indicia arm edges. The shelf 205 is positioned so that the line of intersection of the end cuts abutting the indicia arm edges is parallel to and at the level of the axis of the indicia mechanism concentric shafts 193, 199. With the workpiece sample properly positioned on the shelf means, the respective saw assembly pivot structure is moved, along with the corresponding indicia arm, until the indicia arm edge is lying in the plane of the workpiece sample abutting end cut. In setting up the machine to produce the component members 329, the workpiece sample to be used at the front end of the machine would have end cuts corresponding to those shown at the right end of component member 329, while the workpiece sample to be used at the left end of the machine would have end cuts corresponding to those of the left end of the component member 329. If desired, an actual component member 329 could be used as the workpiece sample.

Assuming that the saw assemblies have now been properly positioned, the conveyor workpiece support runners 279 are positioned so that the workpiece longitudinal axis is in the plane of the front and rear common pivot axes 331, 333. The machine is now ready for operation, and the saw motors 119 and the conveyor drive motor 311 are energized from the machine control assembly 49. Workpieces may then be loaded onto the loading shelf rails 277. In accordance with some aspects of the present invention, any suitable means for supporting workpieces for passing same between the saw pairs at a predetermined level relative to the front and rear common pivot axes 331, 333 may be used. However, in accordance with a feature of the present invention, the conveyor means is made up of a plurality of conveyor assemblies 331, 333 disposed in juxtaposed spaced parallel relation, with each conveyor assembly including an elongate main frame 247, a conveyor runner 279 supported on the main frame and having a parallel workpiece supporting surface extending in the direction of and over approximately the length of the conveyor run, with an endless chain 257 carried by sprockets journalled on the main frame and a plurality of conveyor dogs mounted at spaced intervals to the chain and extending outwardly therefrom, with a cam plate 273 mounted to the main frame 247 at the conveyor loading end portion thereof, with loading shelf means 277 extending outwardly from the loading end of the main frame, with each conveyor dog having a foot portion 265 fixed to the telescoping shank portion 263 and resiliently urged toward the telescoped position and with a cam follower 269 fixed to each conveyor dog shank portion. A working surface 275 on the cam plate is disposed to be engaged by each conveyor dog cam follower as the conveyor dog approaches the loading end, to extend the respective dog shank until the dog reaches the workpiece loading shelf position, at which time the cam follower 269 moves inwardly of the cam plate 273, causing the respective dog foot 265 to engage and resiliently clamp the workpiece. In accordance with a further feature of the present invention, the respective conveyor runner 279 is supported on the conveyor main frame 247 by means including parallel link members 281, 283 which are pivotally connected to the conveyor runner and to the main frame, and there is provided a further link member 285 which is pivotally connected to the conveyor runner at the workpiece loading end thereof and slidably connected at the other end to the main frame so as to provide an inclined workpiece runner, and there is additionally provided means for rotating said parallel link members to position the conveyor runner at selected levels. After the workpiece has been clamped by the dogs, it is carried upwardly on the inclined workpiece runner 285 to the level of the conveyor runner 279 and is then conveyed past the saw assemblies and to the unloading end of the conveyor runner. At the unloading end, the conveyor runner tapers downwardly so that the workpiece is gradually released from the clamping action of the conveyor dogs. If desired, there may be provided synchronously driven workpiece kickoff arms (see FIG. 8) to improve the conveyor workpiece unloading performance.

In the preferred embodiment of the present invention, the saw assembly pivot structures are parallelogram linkage mechanisms. In accordance with a further feature of the present invention, there is provided a front and rear saw assembly support structure each including pivot support means, with means mounting the parallelogram linkage mechanism for the first and second saw assemblies to the front assembly support structure in juxtaposed relation with the respective base link D fixed relative to the pivot support means, with one of the parallelogram linkage mechanisms upstanding and the other depending from the pivot support means, with the respective base link pivot axes aligned by means of respective common pivot shafts 127, 137, with a front common pivot axis 331 defined by a line which is normal to the points of intersection of the longitudinal axes of respective support links E and base links D, and there is further provided means mounting the parallelogram linkage mechanisms for the third and fourth saw assemblies to the rear saw assembly support structure in juxtaposed relation, with the respective base link D fixed relative to the pivot support means, with one of the parallelogram linkage mechanisms upstanding and the other depending from the pivot support means, with respective base link pivot axes aligned by means of respective common pivot shafts 127, 137, with a rear common pivot axis 333 defined by a line which is normal to the points of intersection of the longitudinal axes of respective support links E and base links D, and with the front and rear common pivot axes 331, 333 parallel and lying in a common plane. The arrangement just described, utilizing the common pivot shafts 127, 137 greatly facilitates achieving and maintaining proper alignment relationships of the saw assemblies. For example, the base links D may be mounted on the respective common shafts 127, 137 which are in turn mounted on the respective pivot support means, with aligning bars (not shown) extending from the base links D and support links E with coaxial openings lying on the respective common pivot axes 331, 333, so that the front and rear saw assemblies may be disposed in facing relation with their common pivot axes 331, 333 coincident and with a common shaft (not shown) passing through said coaxial openings. With the parallel linkage mechanisms thus properly aligned, the respective pivot support means may be fixed respectively relative to the machine main frame 11 and machine carriage assembly 13. In a preferred embodiment of the invention, sector gears 123 are utilized to position the parallelogram linkage mechanisms. These sector gears may be conveniently properly aligned by passing the common shaft above-mentioned (not shown) through the sector gear central axis, then fixing the sector gear relative to the support link E and then later removing the central portion of the sector gear. In addition to the alignment advantages, this saw assembly pivot support arrangement greatly enhances the compactness possibilities of the machine. It is necessary that there should be provided a separate pivot support means for each saw assembly in cases where the adjacent saw assemblies do not utilize a common pedestal support structure. It is further preferable that the base link be an integral part of the pivot support means, as is the case with the pivot support bracket 105 shown in the preferred embodiment.

In accordance with a further feature of the present invention, the parallelogram linkage mechanisms are disposed such that there is one upstanding and one depending on the near side of the machine main frame structure central longitudinal axis and one upstanding and one depending on the far side of the last mentioned axis, and with the rotational axes of the saws mounted to said upstanding linkage mechanisms primarily above and the rotational axes of the saws mounted to the depending linkage mechanisms primarily below the front and rear common pivot axes. This arrangement is diagrammatically illustrated in FIG. 12, wherein the common pivot axes 331, 333 are shown in relation to each saw blade face, and the pivot arc for each saw blade is indicated. It can be seen that with this arrangement, the front and rear saw assemblies can be moved very close together without saw blade interference. This makes it possible to cut very short component members. For the cutting of very short component members, the conveyor assemblies 31, 33 may be traversed to their respective extreme frontward and rearward positions.

Having described the present invention in connection with certain embodiments thereof, it is understood that further modifications may suggest themselves to those skilled in the art and it is intended to cover such modifications as fall within the scope of the appended claims. The foregoing disclosure and the showings made in the drawings are merely illustrative of the principles of this invention and are not to be interpreted in a limiting sense.

I claim:

1. A wood component member cutting machine comprising:
   (a) a main frame structure;
   (b) a front and a rear saw assembly support structure, each including pivot support means;
   (c) first, second, third, and fourth saw assemblies;
   (d) each said saw assembly including an electric motor driven circular saw, and a parallelogram linkage mechanism;
   (e) each said parallelogram linkage mechanism including a base link and a support link;
   (f) a carriage assembly mounted on said main frame structure for traverse longitudinally of said main frame structure;
   (g) means mounting said front saw assembly support structure on said main frame structure and means mounting said rear saw assembly support structure on said carriage assembly;
   (h) means mounting the parallelogram linkage mechanisms for said first and second saw assemblies to said front saw assembly support structure in juxtaposed relation, with said respective base link fixed relative to said pivot support means, with one of said parallelogram linkage mechanisms upstanding and the other depending from said pivot support means, with respective base link pivot axes aligned by means of respective common pivot shafts, and with a front common pivot axis defined by a line which is normal to the points of intersection of the longitudinal axes of respective support links and base links;
   (i) means mounting the parallelogram linkage mechanisms for said third and fourth saw assemblies to said rear saw assembly support structure in juxtaposed relation, with said respective base link fixed relative to said pivot support means, with one of said parallelogram linkage mechanisms upstanding and the other depending from said pivot support means, with respective base link pivot axes aligned by means of respective common pivot shafts, with a rear common pivot axis defined by a line which is normal to the points of intersection of the longitudinal axes of respective support links and base links, and with said front and rear common pivot axes parallel and lying in a common plane;
   (j) means mounting the electric drive motor of a respective circular saw to a respective parallelogram linkage mechanism such that a chord of said respective saw coincides with a respective said front and rear common pivot axis;
   (k) means for supporting workpieces for passing same between said saw pairs at a predetermined level relative to said front and rear common pivot axes;
   (l) and respective means for moving said respective pivot linkage mechanisms to position said saws in selected relative angular positions, and means for fixing said saws in the selected relative angular position.

2. The wood component member cutting machine as defined by claim 1, wherein there are included respective means for mounting said respective pivot support means to said respective front and rear saw assembly support structure.

3. The wood component member cutting machine as defined by claim 1, wherein the said parallelogram linkage mechanisms are disposed such that there is one upstanding and one depending on the near side of the machine main frame structure central longitudinal axis and one upstanding and one depending on the far side of said last mentioned axis; and the rotational axes of the saws mounted to said upstanding linkage mechanisms are primarily above and the rotational axes of the saws mounted to said depending linkage mechanisms are primarily below said front and rear common pivot axes.

4. The wood component member cutting machine as defined by claim 1, wherein said base link is an integral part of said pivot support means.

5. The wood component member cutting machine as defined by claim 2, wherein said parallelogram linkage mechanisms are disposed such that there is one upstanding and one depending on the near side of the machine main frame structure central longitudinal axis and one upstanding and one depending on the far side of said last mentioned axis; and the rotational axes of the saws mounted to said upstanding linkage mechanisms are primarily above and the rotational axes of the saws mounted to said depending linkage mechanisms are primarily below said front and rear common pivot axes.

6. The wood component member cutting machine as defined by claim 3, wherein said base link is an integral part of said pivot support means.

7. The wood component member cutting machine as defined by claim 5, wherein said base link is an integral part of said pivot support means.

8. A wood component member cutting machine comprising:
(a) a main frame structure;
(b) a front and a rear saw assembly support structure each including pivot support means;
(c) first, second, third, and fourth saw assemblies;
(d) each said saw assembly including an electric motor driven circular saw, a sector gear, and a parallelogram linkage mechanism;
(e) each said parallelogram linkage mechanism including a base link and a support link;
(f) a carriage assembly mounted on said main frame structure for traverse longitudinally of said main frame structure;
(g) means mounting said front saw assembly support structure on said main frame structure and means mounting said rear saw assembly support structure on said carriage assembly;
(h) means mounting the parallelogram linkage mechanisms for said first and second saw assemblies to said front saw assembly support structure in juxtaposed relation, with said respective base link fixed relative to said pivot support means, with one of said parallelogram linkage mechanisms upstanding and the other depending from said pivot support means, with respective base link pivot axes alinged by means of respective common pivot shafts, and with a front common pivot axis defined by a line which is normal to the points of intersection of the longitudinal axes of respective support links and base links;
(i) means mounting the parallelogram linkage mechanisms for said third and fourth saw assemblies to said rear saw assembly support structure in juxtaposed relation with said respective base link fixed relative to said pivot support means, with one of said parallelogram linkage mechanisms upstanding and the other depending from said pivot support means, with respective base link pivot axes aligned by means of respective common pivot shafts, with a rear common pivot axis defined by a line which is normal to the point of intersection of the longitudinal axes of respective support links and base links, and with said front and rear common pivot axes parallel and lying in a common plane;
(j) means mounting a respective sector gear to a respective parallelogram linkage mechanism such that the axis of the sector gear radial center coincides with a respective said front and rear common pivot axis;
(k) means mounting the electric drive motor of a respective circular saw to a respective sector gear such that a chord of said respective saw coincides with the axis of the respective sector gear radial center;
(l) means for supporting workpieces for passing same between said saw pairs at a predetermined level relative to said front and rear common pivot axes; and
(m) means for moving said respective sector gears to positions said saws in selected relative angular positions, and means for fixing said saws in the selected relative angular position.

9. The wood component member cutting machine as defined by claim 8, wherein there are included respective means for mounting said respective pivot support means to said respective front and rear saw assembly support structure.

10. The wood component member cutting machine as defined by claim 8, wherein the said paralelogram linkage mechanisms are disposed such that there is one upstanding and one depending on the near side of the machine main frame structure central longitudinal axis and one upstanding and one depending on the far side of said last mentioned axis; and the rotational axes of the saws mounted to said upstanding linkage mechanisms are primarily above and the rotational axes of the saws mounted to said depending linkage mechanisms are primarily below said front and rear common pivot axes.

11. The wood component member cutting machine as defined by claim 8, where said base link is an integral part of said pivot support means.

12. The wood component member cutting machine as defined by claim 9, wherein the said parallelogram linkage mechanisms are disposed such that there is one upstanding and one depending on the near side of the machine main frame structure central longitudinal axis and one upstanding and one depending on the far side of said last mentioned axis; and the rotational axes of the saws mounted to said upstanding linkage mechanisms are primarily above and the rotational axes of the saws mounted to said depending linkage mechanisms are primarily below said front and rear common pivot axes.

13. The wood component member cutting machine as defined by claim 10, wherein said base link is an integral part of said pivot support means.

14. The wood component member cutting machine as defined by claim 12, wherein said base link is an integral part of said pivot support means.

15. A wood component member cutting machine comprising:
(a) a main frame structure;
(b) front and rear saw assembly support structures, each including pivot support means;
(c) first, second, third, and fourth saw assemblies;
(d) each said saw assembly including an electric motor driven circular saw, and a parallelogram linkage mechanism;
(e) each said parallelogram linkage mechanism including a base link and a support link;
(f) a carriage assembly mounted on said main frame structure for traverse longitudinally of said main frame structure;
(g) means mounting said front saw assembly support structure on said main frame structure and means mounting said rear saw assembly support structure on said carriage assembly;
(h) means mounting the parallelogram linkage mechanisms for said first and second saw assemblies to said front saw assembly support structure in juxtaposed relation, with said respective base link fixed relative to said pivot support means, with corresponding respective base link pivot axes, coincident, and with a front common pivot axis defined by a line which is normal to the points of intersection of the longitudinal axes of respective support links and base links;

(i) means mounting the parallelogram linkage mechanisms for said third and fourth saw assemblies to said rear saw assembly support structure in juxtaposed relation, with said respective base link fixed relative to said pivot support means, with corresponding respective base link pivot axes coincident, with a rear common pivot axis defined by a line which is normal to the points of intersection of the longitudinal axes of respective support links and base links, and with said front and rear common pivot axes parallel and lying in a common plane;

(j) means mounting the electric drive motor of a respective circular saw to a respective parallelogram linkage mechanism such that a chord of said respective saw coincides with a respective said front and rear common pivot axis;

(k) means for supporting workpieces for passing same between said saw pairs at a predetermined level relative to said front and rear common pivot axes;

(l) respective means for moving said respective pivot linkage mechanisms to position said saws in selected relative angular positions, and means for fixing said saws in the selected relative angular position;

(m) a front and a rear saw position indicia mechanism each including inner and outer concentric shafts journalled for rotation about a respective indicia axis that is parallel to said front and rear common pivot axes, an indicia arm fixed to each said concentric shaft, with the indicia arms of each said indicia mechanism disposed in adjacent juxtaposed relation, with each indicia arm having an edge disposed parallel to the face of a respective circular saw, and means synchronously linking each said concentric shaft to the respective parallelogram linkage mechanism that pivots said respective circular saw.

16. The wood component member cutting machine as defined by claim 15, wherein each said saw position indicia mechanism additionally includes shelf means for positioning a workpiece pattern so as to present its end cuts in abutting relation to said respective indicia arm edges, with the line of intersection of said end cuts parallel to and at the level of the axis of said concentric shafts.

17. The wood component member cutting machine as defined by claim 15, wherein each said parallelogram linkage structure has first and second main links, and said respective indicia axis lies in the plane of said front and rear common pivot axes, and said synchronously linking means includes an indicia link arm fixed to each said concentric shaft and disposed parallel to a respective first main link, an indicia control portion extension for each said second main link pivotally connected to said indicia link arm and parallel to said base link.

18. The wood component member cutting machine as defined by claim 17, wherein each said saw position indicia mechanism additionally includes shelf means for positioning a workpiece pattern so as to present its end cuts in abutting relation to said respective indicia arm edges, with the line of intersection of said end cuts parallel to and at the level of the axis of said concentric shafts.

19. A wood component member cutting machine comprising:

(a) a main frame;
(b) first and second support structures movably secured to said main frame so as to be confined to move along a prescribed path defined as a circular arc the center of which is a first common horizontal axis extending transversely of said main frame;
(c) first and second electric motor driven circular saws mounted on said respective support structure such that a chord of each of their respective blades is coincident with said common axis;
(d) a carriage mounted on said main frame for traverse longitudinally of said main frame;
(e) third and fourth support structures movably secured to said carriage so as to be confined to move along a prescribed path defined as a circular arc the center of which is a second common horizontal axis extending parallel to said first common axis and at the same level thereof;
(f) third and fourth motor driven circular saws mounted on said respective third and fourth support structures such that a chord of each of their respective blades is coincident with said second common pivot axis;
(g) means for supporting workpieces for passing same between said saw pairs and at a predetermined level relative to said common axes;
(h) respective means for moving said respective support structure to position said saws in selected relative angular positions;
(i) a front and a rear saw position indicia mechanism each including inner and outer concentric shafts journalled for rotation about a respective indicia axis that is parallel to said common horizontal axes, an indicia arm fixed to each said concentric shaft, with the indicia arms of each said indicia mechanism disposed in adjacent juxtaposed relation, with each indicia arm having an edge disposed parallel to the face of a respective circular saw, and means synchronously linking each said concentric shaft to the respective support structure that pivots said respective circular saw.

20. The wood component member cutting machine as defined by claim 19, wherein each said saw position indicia mechanism additionally includes shelf means for positioning a workpiece pattern so as to present its end cuts in abutting relation to said respective indicia arm edges, with the line of intersection of said end cuts parallel to and at the level of the axis of said concentric shafts.

21. A wood component member cutting machine comprising:

(a) a main frame;
(b) first and second support structures movably secured to said main frame so as to be confined to move along a prescribed path defined as a circular arc the center of which is a first common horizontal axis extending transversely of said main frame;
(c) first and second electric motor driven circular saws mounted on said respective support structure such that a chord of each of their respective blades is coincident with said common axis;
(d) a carriage mounted on said main frame for traverse longitudinally of said main frame;
(e) third and fourth support structures movably secured to said carriage so as to be confined to move along a prescribed path defined as a circular arc the center of which is a second common horizontal axis extending parallel to said first common axis and at the same level thereof;
(f) third and fourth motor driven circular saws mounted on said respective third and fourth support structures such that a chord of each of their respective blades is coincident with said second common pivot axis;
(g) means for supporting workpieces for passing same between said saw pairs and at a predetermined level relative to said common axes;
(h) means for moving said support structures to position said saws in selected angular positions comprising a front and a rear positioner mechanism each including inner and outer concentric shafts journalled for rotation about an axis that is parallel to said common horizontal axes, a crank rotatably mounted on said inner shaft, means for selectively engaging said crank with said inner and outer shaft, and driving means connecting each said respective inner and outer shaft to pivot a respective said support structure.

22. The wood component member cutting machine as defined by claim 15, wherein said means for moving said pivot linkage mechanisms to position said saws in selected angular postions comprises a front and a rear positioner mechanism each including inner and outer concentric shafts journalled for rotation about an axis that is parallel to said front and rear common pivot axes, a crank rotatably mounted on said inner shaft near said indicia arms, means for selectively engaging said crank with said inner and outer shafts, and driving means connecting each said respective inner and outer shafts to pivot a respective parallelogram linkage mechanism.

23. A conveyor apparatus for conveying elongate wood workpieces in a plane and in a direction transverse to the workpiece longitudinal axis, comprising:
 (a) a plurality of conveyor assemblies disposed in juxtaposed spaced parallel relation;
 (b) each said conveyor assembly including an elongate main frame, a conveyor runner supported on said main frame and having a planar workpiece supporting surface extending in the direction of and over approximately the length of the conveyor run, a sprocket journally mounted to said main frame at each end portion thereof, an endless chain carried by said sprockets, a plurality of conveyor dogs mounted at spaced intervals to said chain and extending outwardly therefrom, a cam plate mounted to said main frame at the conveyor loading end portion thereof, and loading shelf means extending outwardly from the loading end of said main frame;
 (c) each said conveyor dog having a foot portion fixed to a telescoping shank portion, means resiliently urging said shank portion toward the telescoped position, with a cam follower fixed to said shank portion;
 (d) a working surface on said cam plate disposed to be engaged by each conveyor dog cam follower as the conveyor dog approaches the loading end and coacting with said cam follower to extend said respective dog shank until the dog reaches the workpiece loading shelf position at which time the cam follower moves inwardly of the cam plate, causing said dog foot to engage and resiliently clamp said workpiece.

24. The conveyor apparatus as defined by claim 23, wherein said conveyor runner is supported on said main frame by means including parallel link members which are pivotally connected to said conveyor runner and to said main frame, and there is provided a further link member which is pivotally connected at one end to the conveyor runner at the workpiece loading end thereof and slidably connected at the other end to said main frame so as to provide an inclined workpiece runner, and there is additionally provided means for rotating said parallel link members to position said runner at selected levels.

References Cited

UNITED STATES PATENTS

| | | | |
|---|---|---|---|
| 3,080,895 | 3/1963 | Mayo | 143—38 |
| 3,229,732 | 1/1966 | Mayo | 143—38 |

WILLIAM W. DYER, JR., *Primary Examiner.*

W. D. BRAY, *Assistant Examiner.*